(12) United States Patent
Inoue et al.

(10) Patent No.: US 12,208,513 B2
(45) Date of Patent: Jan. 28, 2025

(54) ROBOT

(71) Applicant: FANUC CORPORATION, Yamanashi (JP)

(72) Inventors: Toshihiko Inoue, Yamanashi (JP); Hiroto Matsuo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/031,116

(22) PCT Filed: Oct. 20, 2021

(86) PCT No.: PCT/JP2021/038692
§ 371 (c)(1),
(2) Date: Apr. 10, 2023

(87) PCT Pub. No.: WO2022/091892
PCT Pub. Date: May 5, 2022

(65) Prior Publication Data
US 2023/0405845 A1  Dec. 21, 2023

(30) Foreign Application Priority Data
Oct. 26, 2020  (JP) .................................. 2020-178820

(51) Int. Cl.
*B25J 19/00*  (2006.01)
*B25J 9/00*   (2006.01)

(52) U.S. Cl.
CPC ......... *B25J 19/0025* (2013.01); *B25J 9/0009* (2013.01)

(58) Field of Classification Search
CPC ...... B25J 9/0009; B25J 9/046; B25J 19/0025; B25J 19/0029; B25J 19/0041
See application file for complete search history.

(56) References Cited

U.S. PATENT DOCUMENTS

2015/0114161 A1* 4/2015 Kawase ................ B25J 19/005
74/490.01
2017/0182658 A1* 6/2017 Bordegnoni ......... B25J 19/0025
(Continued)

FOREIGN PATENT DOCUMENTS

CN  109693225 A  * 4/2019  ............. B23Q 1/706
JP  S61257789 A    11/1986
(Continued)

OTHER PUBLICATIONS

English translation of JP 2005014159 A (Year: 2017).*
(Continued)

*Primary Examiner* — Joseph Brown
(74) *Attorney, Agent, or Firm* — KARCESKI IP LAW, PLLC

(57) ABSTRACT

A robot includes a base having an interior space and a first opening portion, a turning drum supported and rotatable around a predetermined rotation axis, a cable distributing board capable of being detachably fixed at a position for closing the first opening portion which is placed at a position on an extending line of the rotation axis, and an inside cable one end of which is provided with a connector fixed to the cable distributing board. The turning drum has a through hole which penetrates through the turning drum in a direction along the rotation axis. A part of the inside cable between a first cable clamp and a second cable clamp is fixed in such a manner that bending deformation and twisting deformation due to rotation of the turning drum with respect to the base are caused in the part of the inside cable.

4 Claims, 8 Drawing Sheets

(56) References Cited

U.S. PATENT DOCUMENTS

2019/0077008 A1* 3/2019 Kobari .................. B25J 9/0009
2019/0321988 A1* 10/2019 Inoue .................. B25J 19/0041

FOREIGN PATENT DOCUMENTS

| JP | 2001273947 A | 10/2001 |
| JP | 2005014159 A | 1/2005 |
| JP | 2007044767 A | 2/2007 |
| JP | 2014198351 A | 10/2014 |
| JP | 2014233763 A | 12/2014 |
| JP | 2017144545 A | 8/2017 |
| JP | 2018125972 A | 8/2018 |
| JP | 2019188497 A | 10/2019 |
| JP | 2020151802 A | 9/2020 |

OTHER PUBLICATIONS

English translation of JP 2017144545 A (Year: 2015).*
International Search Report and Written Opinion dated Jan. 11, 2022, for International Patent Application No. PCT/JP2021/038692.

* cited by examiner

ROBOT

CROSS-REFERENCE TO RELATED APPLICATION(S)

This is a National Stage Entry into the United States Patent and Trademark Office from International Patent Application No. PCT/JP2021/038692 filed on Oct. 20, 2021, which relies on and claims priority to Japanese Patent Application No. 2020-178820, filed on Oct. 26, 2020, the entire contents of both of which are incorporated herein by reference.

FIELD OF THE INVENTION

The present disclosure relates to a robot.

BACKGROUND OF THE INVENTION

There is a known robot which has a base placed on a floor surface and a turning drum which is rotated with respect to the base around a predetermined rotation axis, and an inside cable is wired around a rotation axis and through a through hole which penetrates the turning drum in a direction along the rotation axis (See Japanese Unexamined Patent Application, Publication No. 2020-151802, for example).

The inside cable is connected to an external controller via a plate which closes an opening portion provided at a side surface of the base, and they are directly connected or indirectly connected by using an external cable connected by a connector.

SUMMARY OF THE INVENTION

A first aspect of the present disclosure is a robot having: a base including an interior space and a first opening portion opening the interior space to an outside; a turning drum supported and rotatable around a predetermined rotation axis with respect to the base; a cable distributing board capable of being detachably fixed at a position for closing the first opening portion which is placed at a position on an extending line of the rotation axis; and an inside cable one end of which is provided with a connector fixed to the cable distributing board, wherein the turning drum has a through hole which penetrates through the turning drum in a direction along the rotation axis at a position including the rotation axis, the inside cable is fixed to the cable distributing board by means of a first cable clamp in the interior space, and the inside cable is also fixed to the turning drum at a position opposite to the base relative to the through hole by means of a second cable clamp, and a part of the inside cable which is located at a position between the first cable clamp and the second cable clamp is fixed by the first cable clamp and the second cable clamp in such a manner that bending deformation and twisting deformation due to rotation of the turning drum with respect to the base are caused in the part of the inside cable.

DESCRIPTION OF EMBODIMENT(S) OF THE INVENTION

Depending on an installation manner of a robot, an attachment position of a plate with respect to a base may be located on an extension line of a through hole of a turning drum. In this case, when an inside cable is wired to be straight to the through hole from the plate, every rotation of the turning drum acts to twist the inside cable, which reduces duration of the inside cable.

Accordingly, improvement on the durability of the cable is desired even for a case where the attachment position of the plate with respect to the base is on the extension line of the through hole.

A robot 1 according to a first embodiment of the present invention will be described below with reference to the accompanying drawings.

Figure 1:
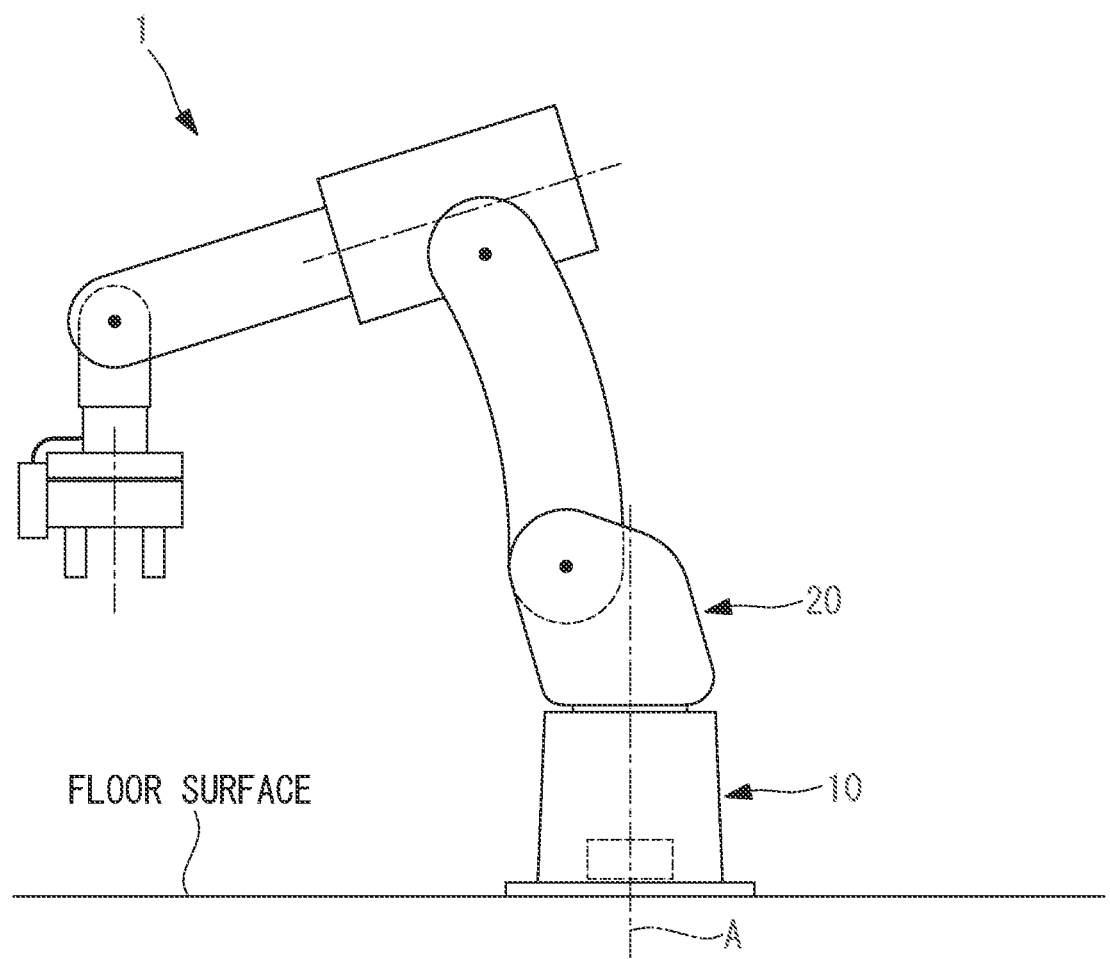
FIG. 1 is an entire view of a structure of a robot according to a first embodiment of the present invention.

As shown in FIG. 1, the robot 1 according to this embodiment is a vertical articulated robot having a base 10 installed on an installation surface and a turning drum 20 which is rotatably supported with respect to the base 10 around a first axis (a rotation axis) A. The description in this embodiment gives an example of a case where the installation surface is a horizontal floor surface, however, the installation surface may be a plan surface with an arbitrary angle which is provided on a ceiling, a wall, or a frame.

Figure 2:
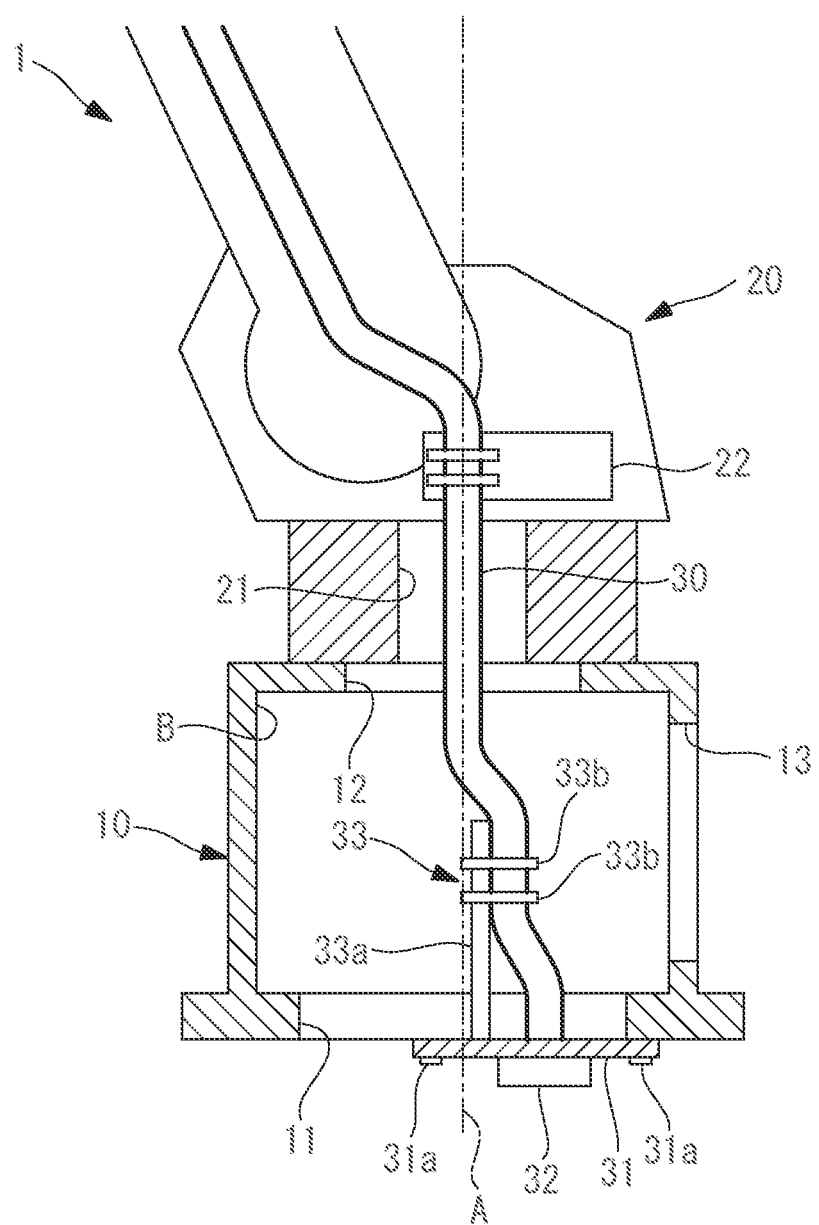
FIG. 2 is a partial sectional view of the robot of FIG. 1 in a state where a cable distributing board is attached to a position for closing an opening portion located at a bottom surface of a base.

When the base 10 is installed on the floor surface, the first axis A extends in a vertical direction. As shown in FIG. 2, the base 10 is formed in a hollow box shape having an internal space B, and openings 11, 12, 13 are respectively provided in a bottom surface which faces the floor surface, a top surface with which the turning drum 20 is provided, and a back surface.

The turning drum 20 is attached to the opening 12 of the top surface so as to be horizontally rotatable around the first axis A by means of a reducer and a bearing which are not shown.

Figure 3:
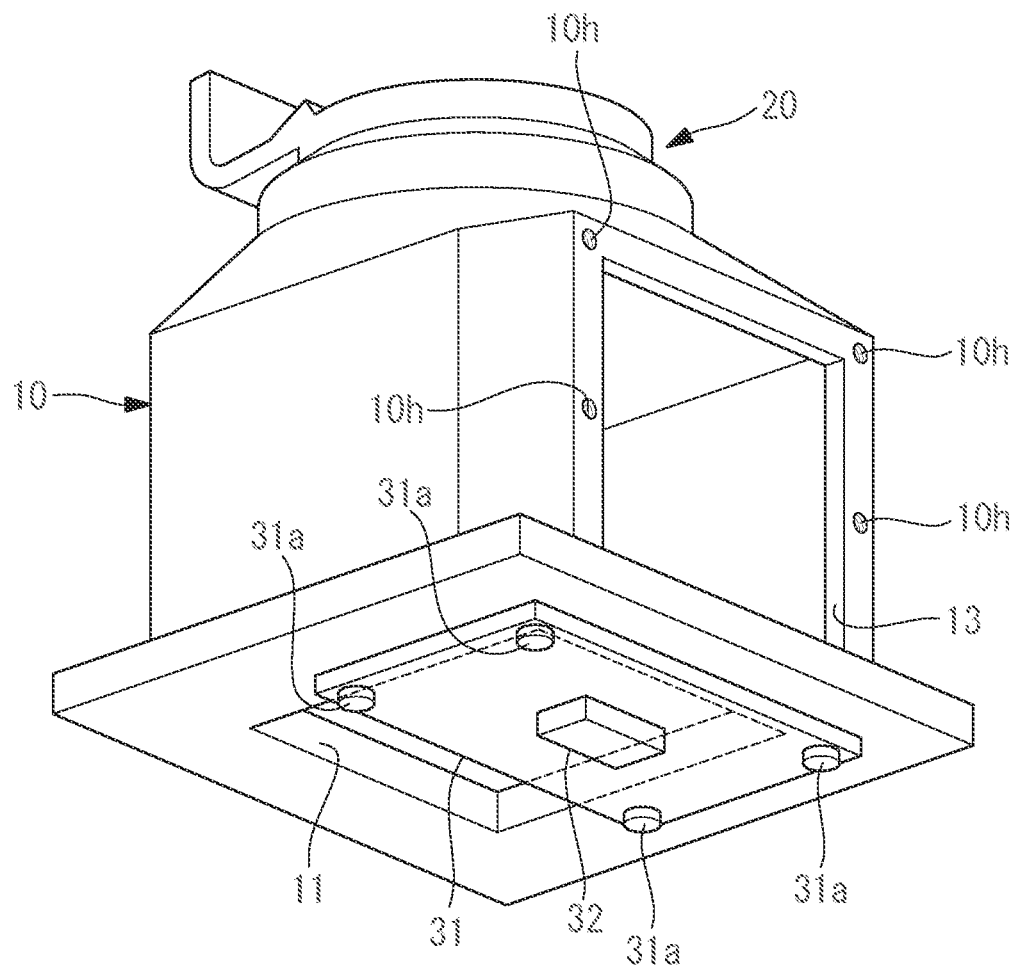
FIG. 3 is an enlarged perspective view showing the opening portion of the base of the robot of FIG. 1.

The opening portion 11 (first opening portion) located at the bottom surface is placed on an extension line of the first axis A and opens the interior space B of the base 10 to the outside that is lower than the base 10. The opening portion (second opening portion) 13 located at the side surface opens the interior space B of the base 10 to the outside and in the horizontal direction crossing the first axis A. As shown in FIG. 3, the opening portions 11 and 13 have the same or similar shape and the same or similar size, and opening portions 11, 13 are large enough so that a later-described cable distributing board 31 can pass through them, and the periphery of the opening portions 11, 13 are provided with screw holes 10h for attaching the cable distributing board 31.

As shown in FIG. 2, the turning drum 20 and the reducer (not shown) have a through hole 21 which penetrates in a direction along the first axis A and centering the first axis A in a state where the turning drum 20 and the reducer are attached to the base 10. The through hole 21 communicates with the interior space B of the base 10 via the opening portion 12 provided on the top surface of the base 10.

Also, the robot 1 according to this embodiment includes an inside cable 30 for transmitting electric power and signal for driving motors (not shown) of a plurality of joint shafts which are supported by the turning drum 20, and the cable distributing board 31 to which a connector 32 provided on one end of the inside cable 30 is fixed. The cable distributing board 31 is a flat plate-like member to which the connecter 32 is fixed and a plurality of holes are provided near the periphery thereof with a space in a circumferential direction.

It is possible to detachably attach the cable distributing board 31 to a position for closing the opening portion 11 or the opening portion 13 by fastening bolts 31 which are penetrated through the above mentioned holes into thread holes 10h which are provided around the opening portion 11 or the opening portion 13. And the cable distributing board 31 is attached to the position for closing the opening portion 11 or the opening portion 13 so that a connecting portion of the connector 32 is exposed to the outside, and one end of the inside cable to which the connector 32 is connected can be placed in the interior space B of the base 10.

A first cable clamp 33 for fixing a part of the inside cable 30, which is arranged at a position in the interior space B of the base 10, is fixed to the cable distributing board 31. The first cable clamp 33 includes a supporting portion 33a which extends in a direction crossing the fiber distribution board 31. A position in the middle of the length direction of the inside cable is secured by a fastener 33b such as a binding band so that the inside cable 30 can be supported along the supporting portion 33a.

The supporting portion 33a of the first cable clamp 33 is placed at a position to extend apart from the first axis A with a space therebetween in the horizontal direction and in a parallel manner when the cable distributing board 31 is fixed at the position for closing the opening portion 11. By this, a part of the inside cable 30 which extends along the supporting portion 33a of the first cable clamp 33 is fixed at position horizontally offset with respect to the first axis A.

On the other hand, a second cable clamp 22 for fixing a position in the middle of the inside cable 30 in the length direction which is withdrawn from the interior space B of the base through the through hole 21 is fixed to the turning drum 20 which is located at a position opposite from the base 10 across the through hole 21.

Accordingly, the inside cable 30 is fixed to the turning drum 20 at a position located apart from the first axis A in the horizontal direction in the interior space B of the base 10 and at the position located higher than the through hole 21 by means of the second cable clamp 22.

When the turning drum 20 is rotated around the first axis A with respect to the base the second cable clamp 22 is rotated together with the turning drum 20. In this case, since the inside cable 30 is located at a position inside the through hole 21 including the first axis A, it is possible to reduce a change amount of position of the inside cable 30, which is caused by the rotation of the turning drum 20.

Moreover, when the second cable clamp 22 is rotated, the inside cable 30 fixed to the second cable clamp 22 is also rotated, and therefore, the inside cable 30 located at the position between the first cable clamp 33 and the second cable clamp 22 is twisted around the first axis A.

In this case, the inside cable 30 located at the position between the first cable clamp 33 and the second cable clamp 22 is not simply wired to be straight in the vertical direction but is curved in a direction having a horizontal direction component by the first cable clamp 33.

As a result, when the inside cable 30 is twisted due to rotation of the turning drum 20, a twisting deformation is generated in the part of the inside cable 30 located between the first cable clamp 33 and the second cable clamp 22, and a curving deformation is also generated in a part of the inside cable 30 extending in the direction having the horizontal direction component.

That is to say, not only the twisting deformation but also the curving deformation can be generated in the movable portion of the inside cable 30 which is wired from the base 10 to the turning drum 20. By this, it is possible to reduce a load applied to the inside cable 30 in the twisted direction by amount of the curving deformation in comparison with a case where only the twisting deformation is given to the inside cable 30, which is advantageous for improving durability of the inside cable 30.

Figure 4:
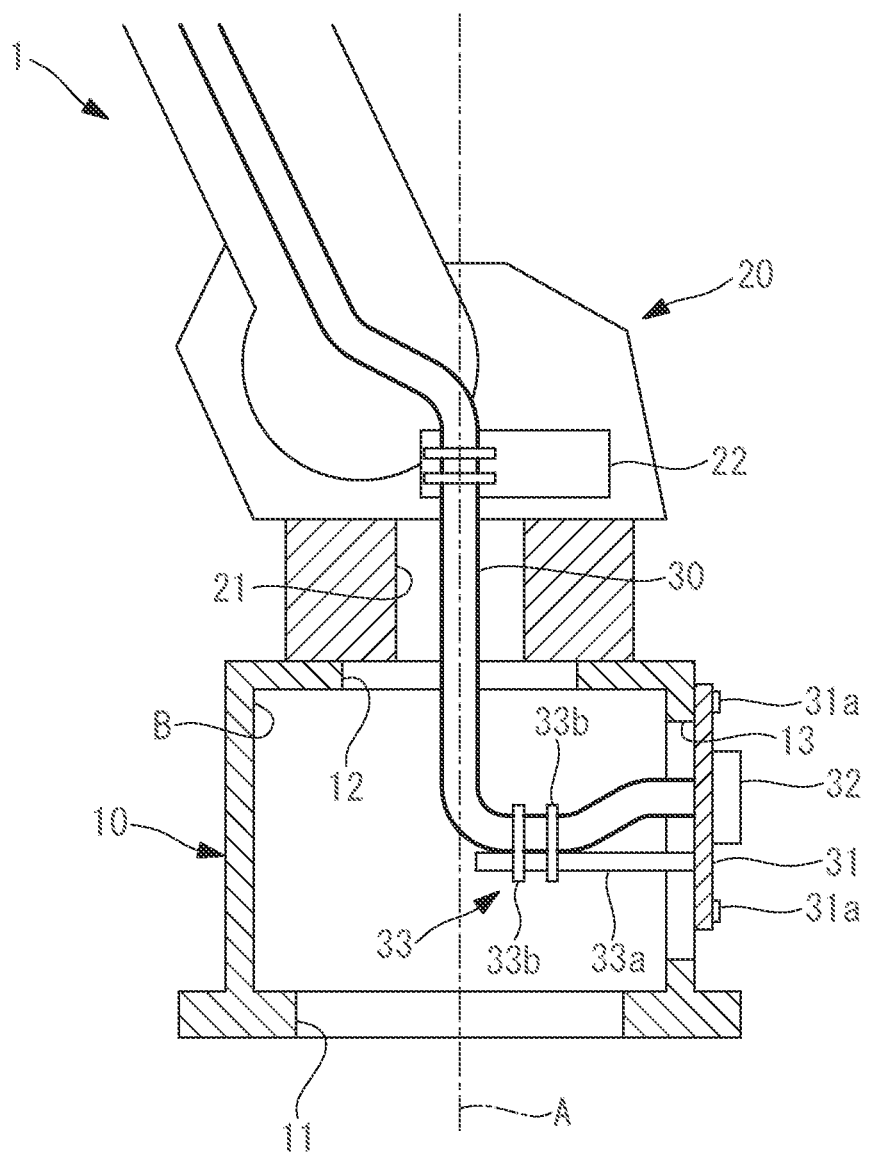
FIG. 4 is a partial sectional view of the robot of FIG. 1 in a state where the cable distributing board is attached to the position for closing an opening portion of a side surface of the base.

On the other hand, as shown in FIG. 4, the supporting portion 33a of the first cable clamp 33 is placed at a position to extend along the plan surface crossing the first axis A when the cable distributing board 31 is fixed at the position for closing the opening portion 13. By this, the inside cable 30 is curved toward the vertical direction from the part which is placed to be substantially horizontal along the supporting portion 33a of the first cable clamp 33 so as to pass through the through hole 21.

That is, in this case also, the part of the inside cable 30 placed at the position between the first cable clamp 33 and the second cable clamp 22 has a portion extending in the direction having the horizontal direction component, at a position in a lower part of the inside cable 30 extending in the vertical direction through the through hole 21. Therefore, when the inside cable 30 is twisted due to the rotation of the turning drum 20, not only the twisting deformation but also the curving deformation can be given to the movable part of the inside cable 30 wired from the base 10 to the turning drum 20.

In the robot 1 according to this embodiment configured as described above, a case where the cable distributing board 31, which is fixed at the position for closing the opening portion 13 as shown in FIG. 4, is moved to be fixed at the position for closing the opening portion 11 as shown in FIG. 2 will be described.

As described above, in such a case where the cable distributing board 31 is fixed at the position for closing the opening portion 13, the connector 32 is fixed to the cable distributing board 31 and the inside cable 30 is also secured to the first cable clamp 33 by means of the fastener 33b.

In this state, the first cable clamp 33 extends along the horizontal surface which crosses the first axis A. By this, a part of the inside cable 30, which is extended in the horizontal direction at the fixed position at the first cable clamp 33, is bend by approximately 90 degrees so that the inside cable 30 becomes an upright state along the first axis A in the through hole 21.

To change the attachment position of the cable distributing board 31 in this state, the cable distributing board 31 is detached from the base 10 by removing bolts 31a that fix the cable distributing board 31 to the base 10.

Figure 5:
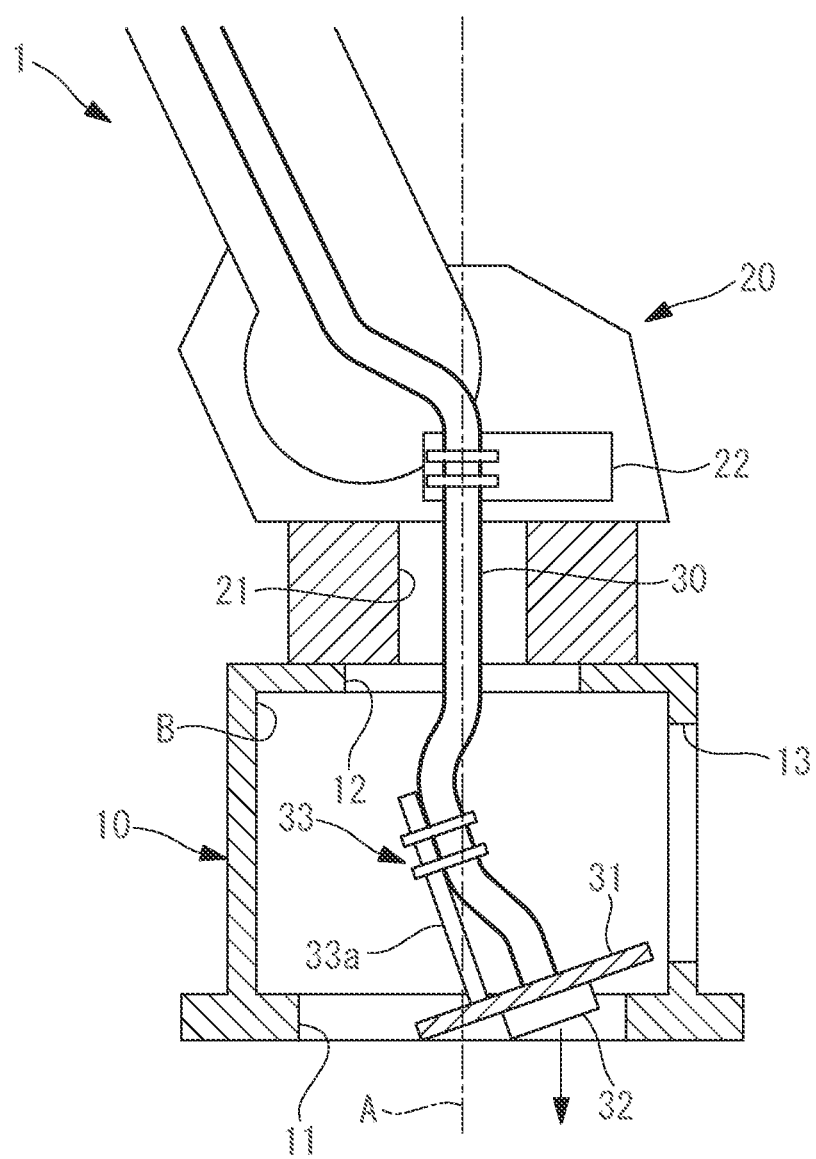
FIG. 5 is a partial sectional view showing a method for moving the cable distributing board in the robot of FIG. 1.

Subsequently, as shown in FIG. 5, after inserting the cable distributing board 31, which is in a state of supporting the part of the inside cable 30 by means of the first cable clamp 33, into the interior space B of the base 10 from the opening portion 13, the cable distributing board 31 is taken out from the base 10 from the opening portion 11. And the first cable clamp 33 is arranged parallel with respect to the first axis A with a space therebetween in the horizontal direction by fixing the cable distributing board 31 at a position for closing the opening portion 11 by means of the bolts 31a.

By this, the inside cable 30 is bent in a cranked shape from the part of the inside cable extends in the vertical direction at the fixed position by the first cable cramp 33 so that the inside cable 30 becomes an upright state along the first axis A in the through hole 21, as shown in FIG. 2.

Like this, with the robot 1 according to this embodiment, even in a case where the robot 1 is shipped in a state where the cable distributing board 31 is fixed to the position for closing the opening portion 13, the cable distributing board 31 can easily be moved to the position for closing the opening portion 11 in accordance with an installation condition of a user. That is to say, positions of the cable distributing board 31 can be changed only by attaching and removing the bolts 31a which are used for attaching the cable distributing board 31 to the base and it is possible to prevent increment of load applied on the inside cable 30 due to the operation of the robot 1 as minimum as possible when the position of the cable distributing board 31 is changed. For that reason, it is possible to change the attachment positions of the cable distributing board 31 easily without changing the inside cable 30, such as changing the fixed position of the first cable clamp 33 and the like, which is advantageous.

Note that, the present embodiment describes the case where the cable distributing board 31 which is fixed to the position for closing the opening portion 13 is moved to the position for closing the opening portion 11, however, instead of this, the same or the similar effect can be obtained in a case where the cable distributing board 31 is moved to the position for closing the opening portion 11 to the position for closing the opening portion 13.

Further, in this embodiment, when the cable distributing board 31 is fixed to the position for closing the opening portion 11, the inside cable 30 is arranged at the position which is apart from the first axis A with a space therebetween in the horizontal direction. This space can be set at any size. However, it is preferable that the cable distributing board 31 is placed with a space larger than an outer diameter of the inside cable 30 with respect to the first axis A. By this, the movable portion of the inside cable 30 which is placed within the interior space B of the base 10 can be bent in the direction having the horizontal direction component in a more reliable manner.

Figure 6:
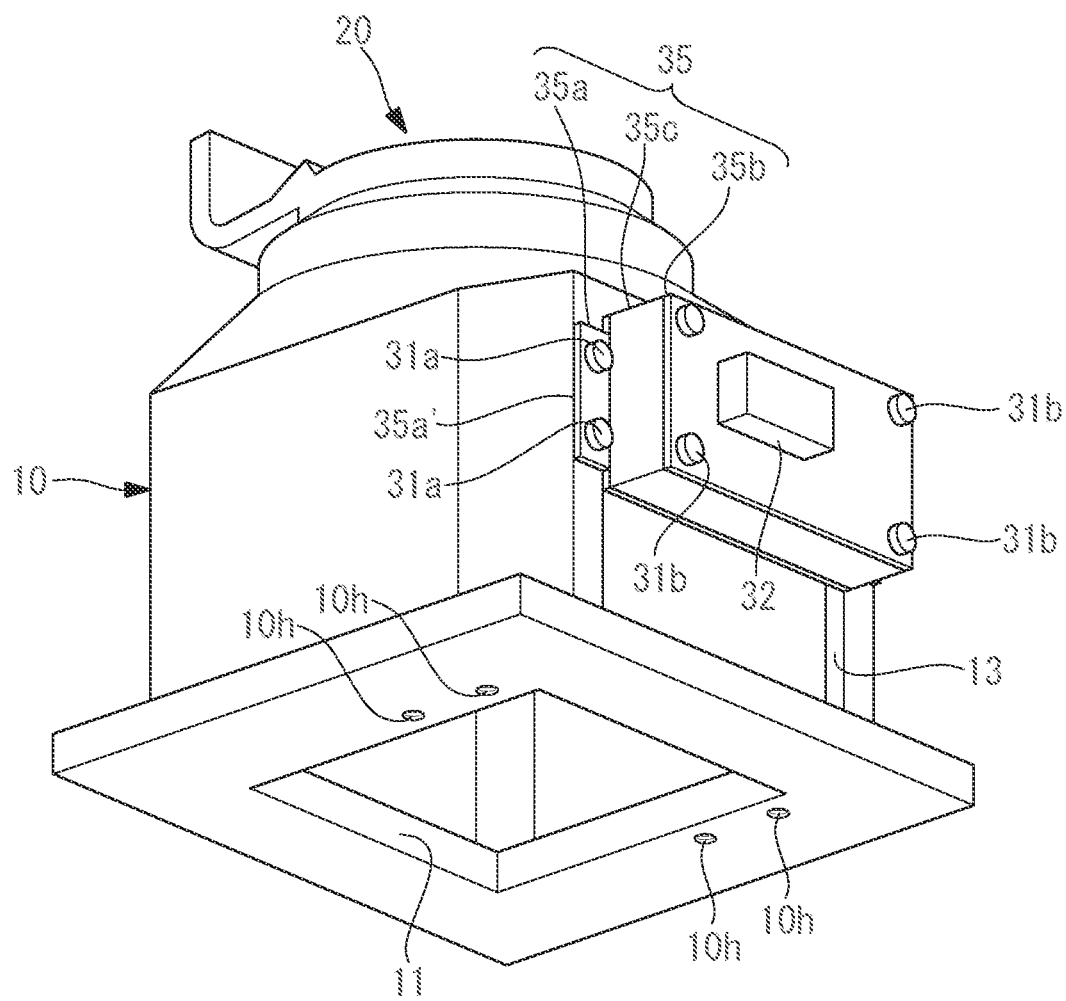
FIG. 6 is an enlarged perspective view showing a first modified example of the robot of FIG. 1.

Moreover, this embodiment discloses the cable distributing board 31 that is made of a flat plate-like material, however, instead of this, a cable distributing board 35 in a box shaped structure, which is shown in FIG. 6, may be adopted.

Figure 7:
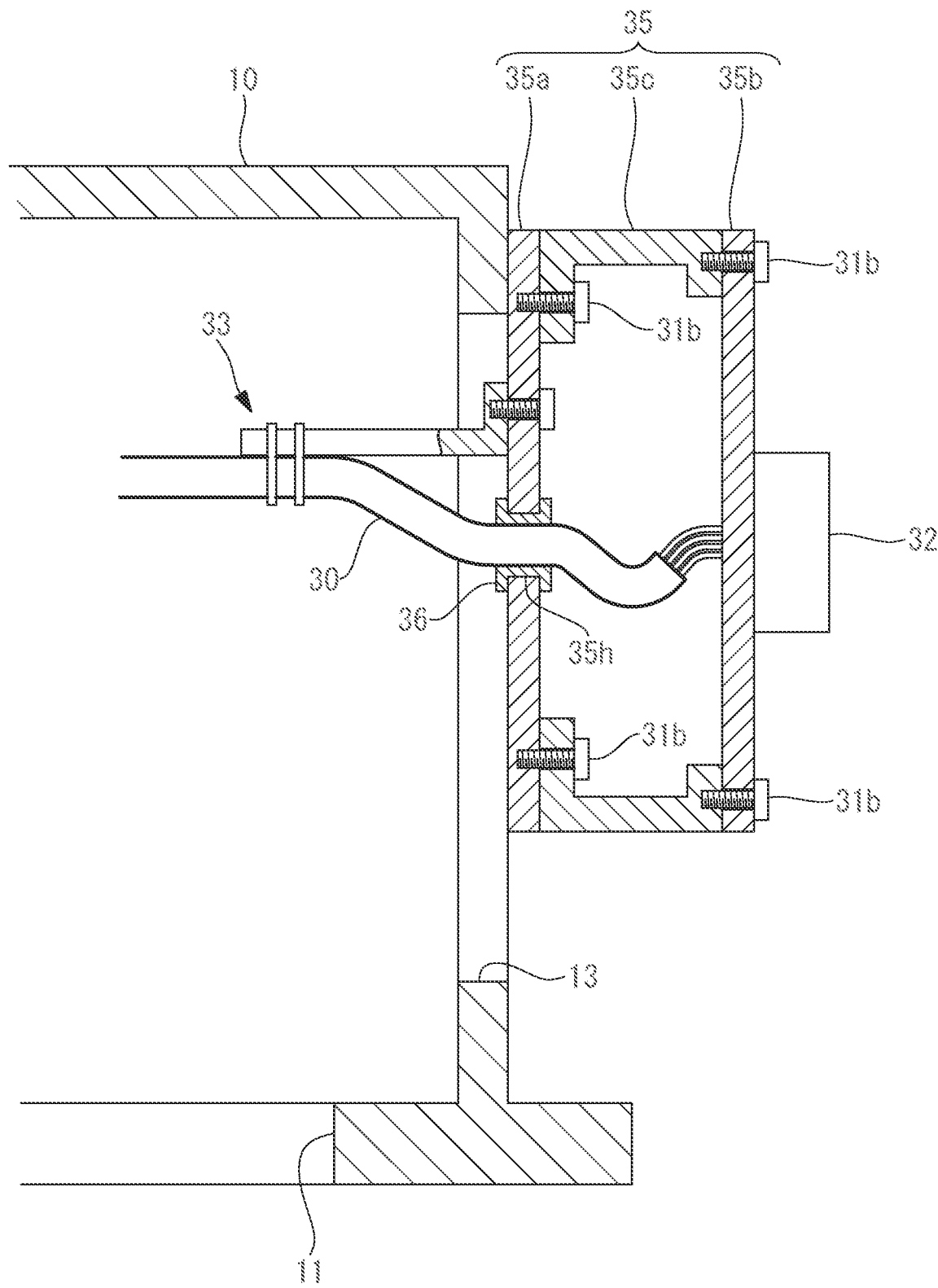
FIG. 7 is a partial sectional view of a base and a cable distributing board of the robot of FIG. 6

In the examples shown in FIGS. 6 and 7, the cable distributing board 35 is formed in a hollow and substantially rectangular parallelepiped box shape. The cable distributing board 35 has a back surface plate 35a for covering a part of the opening portion 13, a front surface plate which is placed parallel with respect to the back surface plate 35a with a space therebetween, and a frame part 35c which is placed at a position between the back surface plate and the front surface plate 35b.

As shown in FIG. 6, the back surface plate 35a has a pair of attachment parts 35a' which extends outwardly beyond a pair of parallel side surfaces of the frame part 35c. A plurality of through holes are provided in the attachment parts 35a', and the bolts 31 which penetrate through the through holes are fastened to screw holes (not shown) provided around the opening portion 13 so that the cable distributing board 35 can be fixed to the position for closing the opening portion 13.

As shown in FIG. 7, the first cable clamp 33 is fixed to the back surface plate 35a. Also, the back surface plate 35a has a through hole 35h through which the inside cable 30 penetrates, and a space between the through hole 35h and the inside cable 30 are waterproofed by a grommet 36.

The connecter 32 which is attached to one end of the inside cable 30 is fixed to the front surface plate 35b in such a manner that a connection part thereof is exposed outside.

The back surface plate 35a and the front surface plate 35b are attached to the frame part 35c by means of the bolt 31b having a seal member (not shown) such as a gasket and the like therebetween. By this, the inside of the cable distributing board 35 is sealed in a liquid-tight state, an unbundled wire can be protected from dust or liquid in such a case where the unbundled wire is exposed from a sheath in one end of the inside cable 30 which is connected to the connector 32.

Also, the opening portion 11 and the opening portion 13 are set to be large enough so that the cable distributing board 35 can pass through them. Accordingly, the cable distributing board 35, which supports a part of the inside cable 30 is supported by means of the first cable clamp 33, is detached from the position for closing the opening portion 13 so that the cable distributing board 35 is taken out from the opening portion 11 from the interior space B of the base 10.

That is, the same as or similar to the cable distributing board 31 made of the flat plate-like member, the position of the cable distributing board 35 can be changed easily by simply removing the bolts 31a which attach the cable distributing board 35 to the base 10. Also, it is not necessary to rewire the inside cable 30 each time the position of the cable distributing board 35 is changed, the movable portion of the inside cable 30 can be arranged by bending in a direction having the horizontal direction component.

Moreover, the opening portion 11 and the opening portion 13 of the base 10 in this embodiment are more or less the same shape and size, however, instead of this, the opening portion 11 and the opening portion 13 may have different shapes and sizes.

Figure 8:
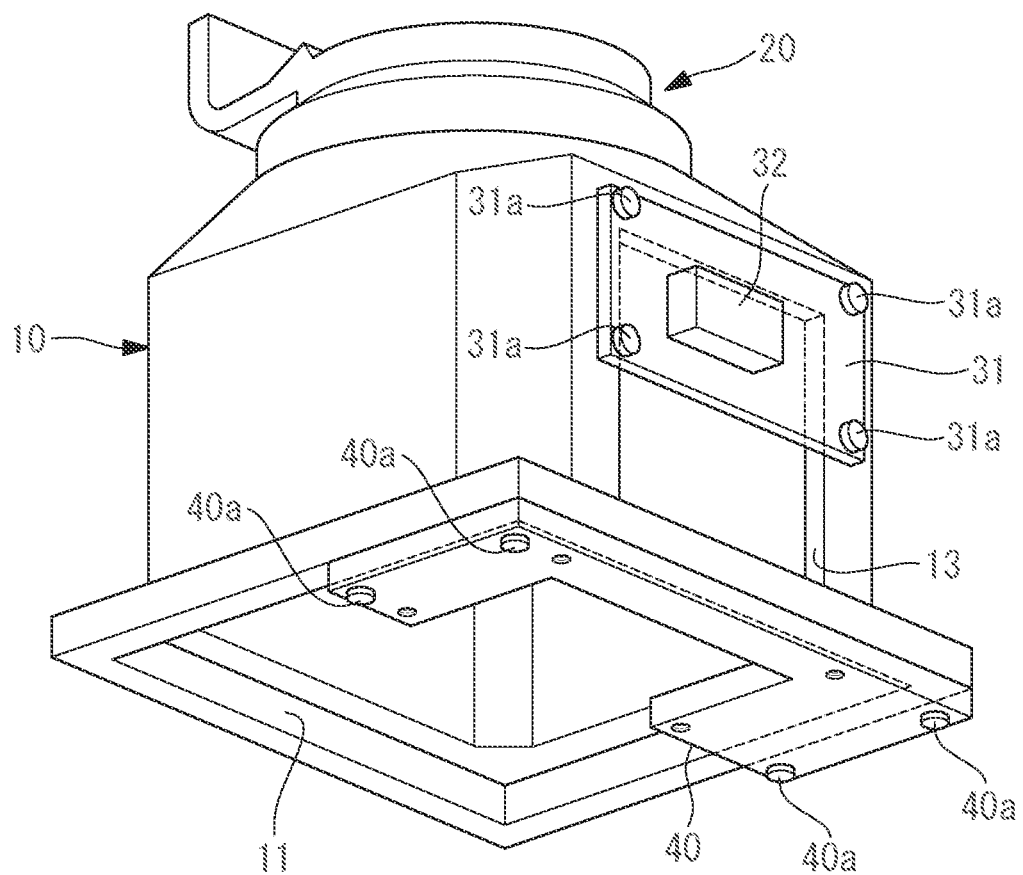
FIG. 8 is an enlarged perspective view showing a second modified example of the robot of FIG. 1.

In this case, as shown in FIG. 8, it is applicable as long as an adapter 40 which detachably attaches the cable distributing boards 31, 35 is fixed to the larger one of the opening portions 11, 13 by means of bolts 40a and the like. By this, even when the opening portion 11 and the opening portion 13 have different shapes and sizes, the cable distributing boards 31, 35 can respectively be arranged at the position for closing the opening portion 11 and the position for closing the opening portion 13.

The invention claimed is:
1. A robot comprising:
a base including an interior space and a first opening portion opening the interior space to an outside;
a turning drum supported by the base and rotatable around a predetermined rotation axis with respect to the base;
a cable distributing board capable of being detachably fixed to a position for closing the first opening portion which is placed at a position on an extending line of the rotation axis;
an inside cable one end of which is provided with a connector fixed to the cable distributing board, and a first cable clamp which is long in a thickness direction of the cable distributing board, the first cable clamp fixed to the cable distributing board, wherein the turning drum has a through hole which penetrates through the turning drum in a direction along the rotation axis at a position including the rotation axis, wherein the inside cable is fixed to the first cable clamp in the interior space so that the inside cable is laid along a longitudinal direction of the first cable clamp, and the inside cable is also fixed to the turning drum at a position opposite to the base relative to the through hole by means of a second cable clamp, and wherein the base has a second opening portion opening the interior space in a direction different from the first opening portion, wherein the cable distributing board is capable of being detachably fixed to a position for closing the second opening portion, and wherein the cable distributing board has a size which can pass through the first opening portion and the second opening portion in a state where the inside cable is fixed to the first cable clamp of the cable distributing board.

2. The robot according to claim 1, wherein the first cable clamp is configured to fix a part of the inside cable which is arranged to be parallel to the rotation axis and which is arranged to make a space between the part and the rotation axis.

3. The robot according to claim 2, wherein the space is larger than an outer diameter of the inside cable.

4. A method of changing a position of a cable distributing board detachably attached to a base of a robot, wherein the robot comprises:

an interior space in the base and a first opening portion opening the interior space to an outside;

a turning drum supported by the base and rotatable around a predetermined rotation axis with respect to the base;

the cable distributing board capable of being detachably fixed to the position for closing the first opening portion which is placed at a position on an extending line of the rotation axis;

an inside cable, one end of which is provided with a connector fixed to the cable distributing board;

a through hole which penetrates through the turning drum in a direction along the rotation axis at a position including the rotation axis; and a first cable clamp which is long in a thickness direction of the cable distributing board, the first cable clamp fixed to the cable distributing board, wherein the base has a second opening portion opening the interior space in a direction different from the first opening portion, wherein the method comprises:

fixing the inside cable to the first cable clamp in the interior space so that the inside cable is laid along a longitudinal direction of the first cable clamp;

fixing the inside cable to the turning drum by a second cable clamp at a position opposite to the base relative to the through hole;

attaching the cable distributing board to the first opening at a position where the rotation axis penetrates the cable distributing board so that a part of the inside cable is placed so as to make a space between the part and the rotation axis by fixing the inside cable to the first cable clamp;

detaching the cable distributing board from the first opening in a state in which the inside cable is fixed to the first cable clamp, and moving the cable distributing board toward a side of the second surface through the first opening portion, the interior space, and the second opening portion in a state in which the inside cable is fixed to the first cable clamp of the cable distributing board; and attaching the cable distributing plate to the second opening portion.

* * * * *